Figure 1:
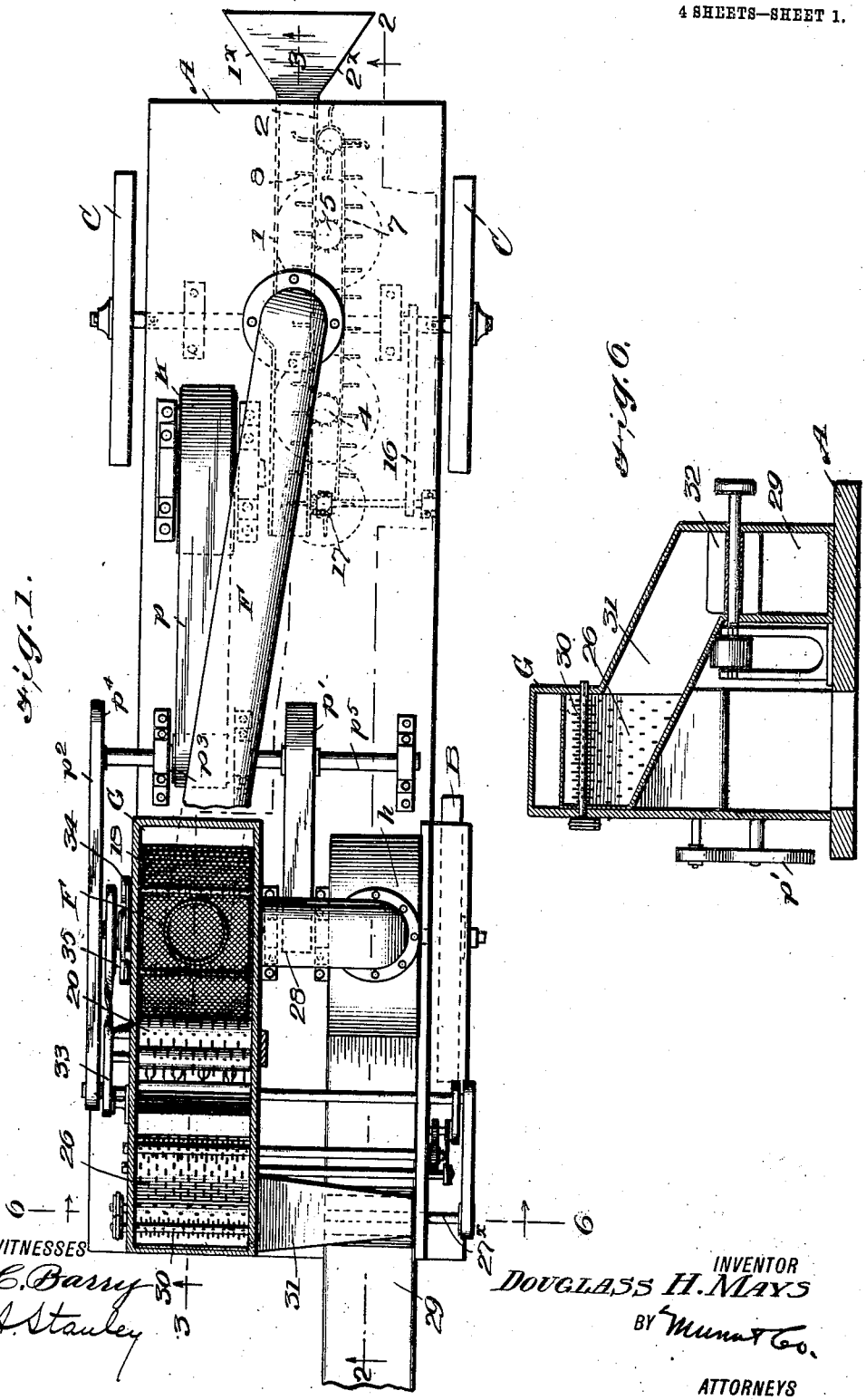

D. H. MAYS.
COTTON HARVESTER.
APPLICATION FILED MAR. 23, 1909.

946,454.

Patented Jan. 11, 1910.
4 SHEETS—SHEET 4.

WITNESSES
F. C. Barry
L. A. Stanley

INVENTOR
DOUGLASS H. MAYS
BY Munn & Co.
ATTORNEYS

UNITED STATES PATENT OFFICE.

DOUGLASS HOLLOWAY MAYS, OF BENOIT, MISSISSIPPI.

COTTON-HARVESTER.

946,454.   Specification of Letters Patent.   Patented Jan. 11, 1910.

Application filed March 23, 1909. Serial No. 485,224.

*To all whom it may concern:*

Be it known that I, DOUGLASS H. MAYS, a citizen of the United States, and a resident of Benoit, in the county of Bolivar and State of Mississippi, and whose post-office address is the same, have invented a certain new and useful Improvement in Cotton-Harvesters, of which the following is a specification.

My invention relates to improvements in means for harvesting cotton from the field and it consists in the combinations, constructions and arrangements herein described and claimed.

The object of my invention is to provide a device which is adapted for gathering cotton from the maturing plants and for separating the same from foreign substances which are gathered therewith.

A further object of my invention is to provide a device capable of gathering cotton, which effects this operation without injuring the plants, but which leaves them in the same condition as they were before the cotton is gathered.

The invention contemplates pneumatic means for effecting both the gathering and the separating operations.

My invention is illustrated in the accompanying drawings in which similar reference characters indicate like parts in the several views, and in which—

Figure 2:
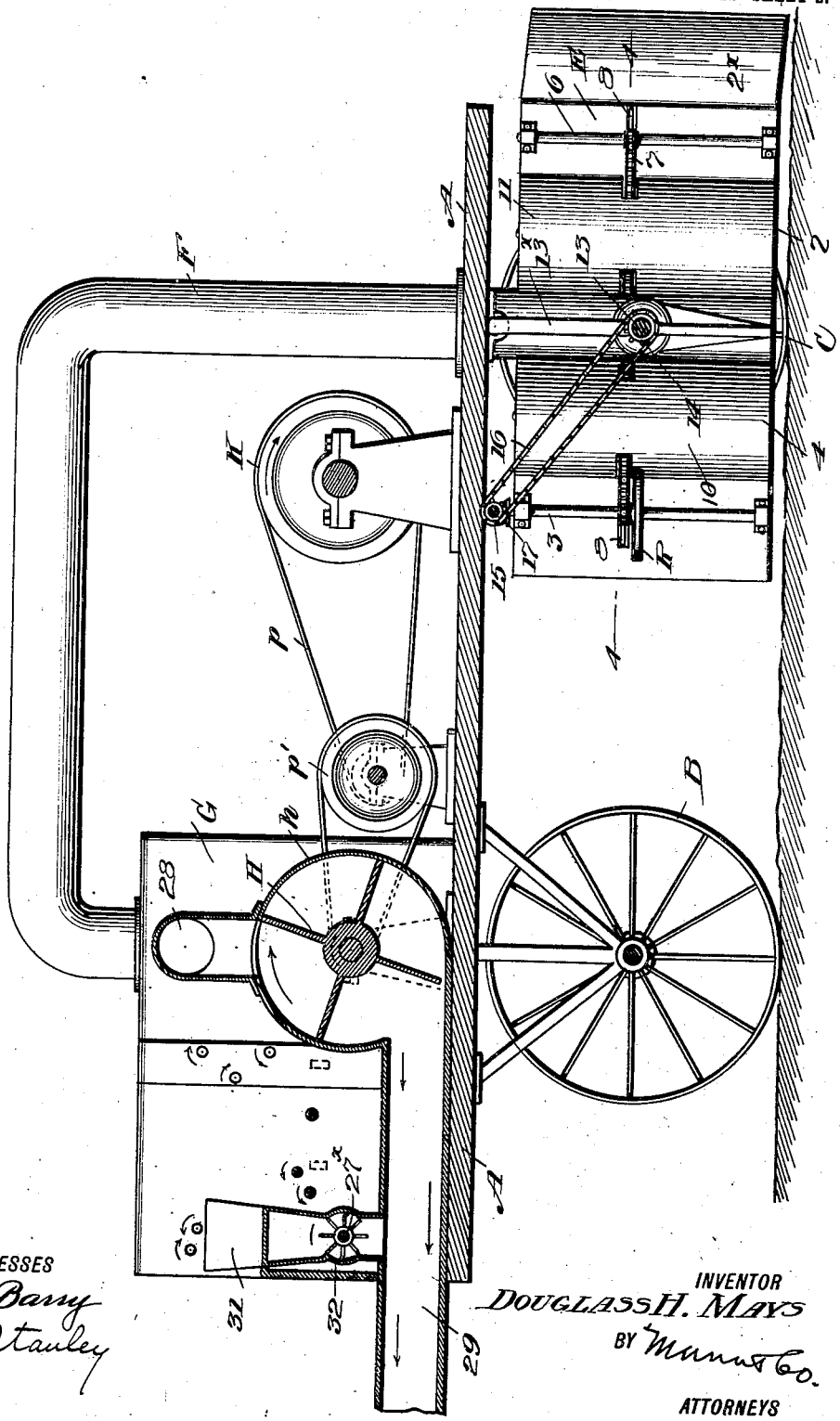
Figure 3:
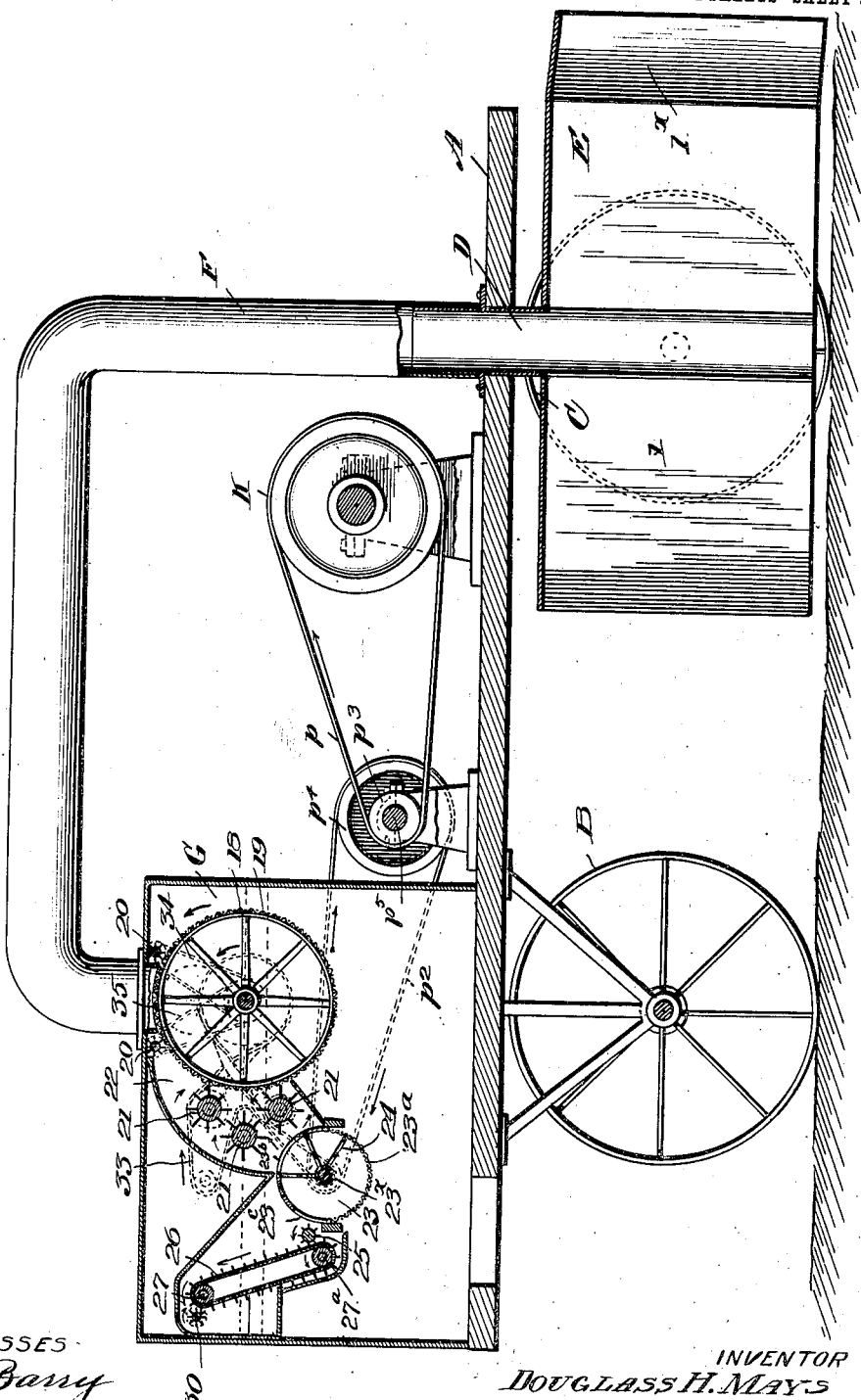
Figure 4:
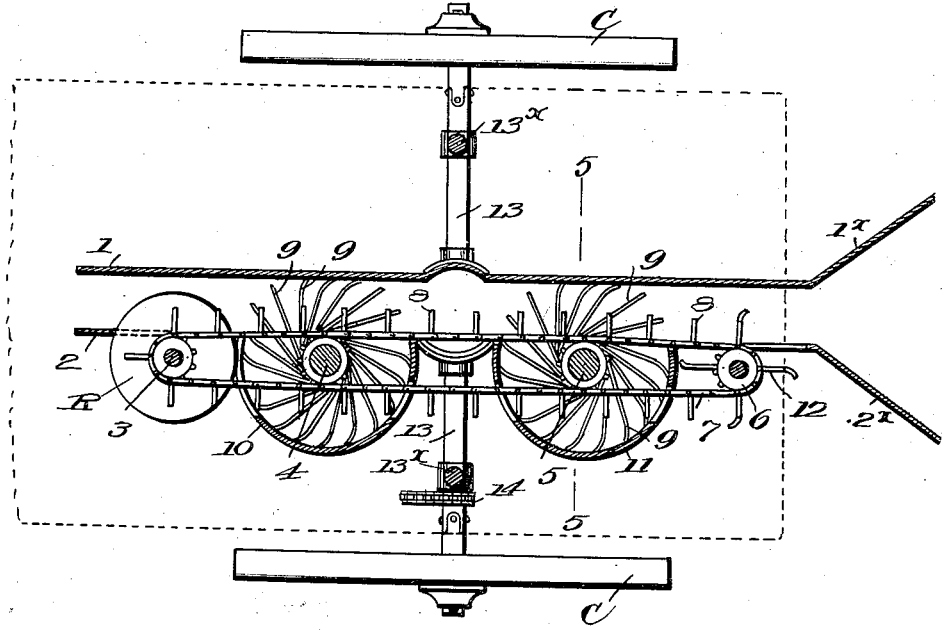
Figure 5:
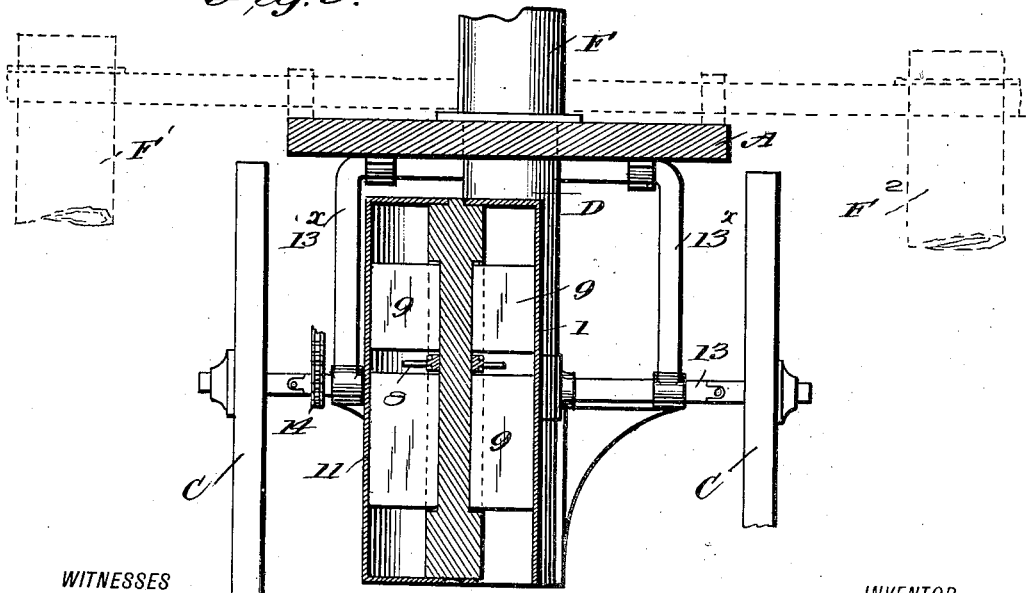

Figure 1 is a plan view, certain parts of the device being in section. Fig. 2 is a longitudinal section along the line 2—2 of Fig. 1. Fig. 3 is a longitudinal section along the line 3—3 of Fig. 1. Fig. 4 is a horizontal section along the line 4—4 of Fig. 2. Fig. 5 is a detail section along the line 5—5 of Fig. 4, and Fig. 6 is a section along the line 6—6 of Fig. 1.

In carrying out my invention I provide a main carrying frame A, provided with rear wheels B and front wheels C. At the forward end of the main frame I arrange a depending tube or pipe D at the lower end of which is attached a casing E, see Figs. 2 and 3. The casing E consists of the parallel walls 1 and 2 having the diverging extensions 1$^x$ and 2$^x$ at their front ends and constitutes in fact a suction box which may be brought successively above each plant in a row and in which the operation of gathering the cotton is performed. On the outer side of the wall 2 are mounted the four shafts 3, 4, 5 and 6 each bearing a sprocket wheel arranged to be driven by a common sprocket chain 7 which is provided with the laterally extending arms 8 as clearly shown in Fig. 4. The sprocket wheel 3 is the driving sprocket as will be hereinafter explained. On the shafts 4 and 5 are mounted a series of flaps 9 arranged to project through an opening in the wall 2 and to come into contact with the wall 1 in the manner shown in the figure. Around the flaps are the cylindrical casings 10 and 11 which have openings therethrough so that the sprocket chain 7 with its associated arms 8 may have free passage. The forward sprocket shaft 6 is provided with a series of arms 12 also adapted to pass through an opening in the wall 2.

Referring now to Figs. 4 and 5, it will be seen that the axles 13 of the wheels C are supported by the U-shaped member 13$^x$ and one of the wheels is provided with a sprocket wheel 14 which drives a sprocket wheel 15, secured just underneath the frame A, by means of the sprocket chain 16. By means of the bevel gear connection 17, the shaft 3 is turned and through the medium of the sprocket chain 7 turns the vertical shafts 4, 5 and 6.

Referring now particularly to Fig. 3, it will be seen that the pipe D communicates with a suction pipe F leading to the casing G which contains the separating and cleaning mechanism. This comprises a cylindrical drum 18 having a periphery of wire screen 19, see Fig. 3 which is mounted in the top of the casing G, just beneath the bent end of the suction pipe F. In close proximity to the drum 18 are the rolls 20, while toward one side of the drum are the breakers 21. These breakers are disposed in a chute 22 leading to a cylinder 23 having a bottom of wire mesh 23$^a$ and openings 23$^b$ and 23$^c$ in its top and sides for the entrance and exit of cotton bolls. Within the cylinder 23 are mounted the radial arms 24. Immediately opposite the opening 23$^c$ is a spiked roll 25 arranged to deliver the cotton to a studded endless belt 26 which is arranged to run over the lower and upper rolls 27$^a$, 27 respectively.

Referring now to Fig. 2, it will be seen that I have provided a suction fan H at the side of the cleaning mechanism but in communication therewith by the pipe 28. Leading from the opposite side of the fan casing $h$ is the pipe 29.

Referring now to Figs. 3 and 6, it will be seen that the studded belt 26 delivers the cotton to a spiked roll 30. From thence it is dropped into the inclined chute 31, see Fig. 6, which leads to the feeder 32, the latter being in communication with the pipe 29 leading from the fan. Mounted upon the carrying frame A is the engine K which is arranged to drive the cleaning and separating mechanism through the medium of the belt $p$ and the pulley $p^3$, shaft $p^5$ and pulleys $p'$ and $p^4$. The latter drives the shaft $23^x$ of the cylinder 23 by means of the belt $p^2$. The shaft $23^x$ has a pulley and the rolls 20 and 21 and the drum 19 are provided with similar pulleys arranged to be engaged by the belts 33, 34 and 35 in the manner clearly shown in Fig. 3.

From the foregoing description of the various parts of the device the operation thereof may be readily understood.

The machine may be drawn along the cotton rows by means of horse power or it may be propelled by mechanical means. The arms $1^x$ and $2^x$ serve to guide the plants between the walls 1 and 2 of the casing E. The sprocket chain 7 is geared to move at the same rate that the machine is progressing so that the arms 8 are relatively stationary when they come in contact with the plants but keep them from being bent over. As the machine passes along the plants pass the flexible flaps or arms 9 and eventually reach the enlarged portion, the upper end of which constitutes the pipe D. A constant current of air is being drawn by the fan through the suction pipe F and since the flaps prevent the entrance of air from the ends of the casing all the air is drawn in from the bottom. When the plants enter the enlarged space between the two sets of flaps the branches spread out and the cotton bolls are sucked up into the pipe F and are conveyed therethrough to the casing G, see Fig. 3. In the meantime the machine is passing onwardly and the flaps of the wheel 4 permit the plants to pass out. As the plants are about to leave the space between the walls 1 and 2 they come into contact with the revolving disk R, see Fig. 2, which presses the plants away from the arms 9 thereby insuring their disengagement from the latter. The cotton bolls being deposited on the drum 19 are thereupon drawn by the rolls 20 and delivered to the breakers 21 which thoroughly break up the hulls and in turn deliver the crushed bolls into the cylinder 23. Most of the leaf portions are screened out, this action being greatly facilitated by the revolution of the arms 24 which receive the cotton from the top opening $23^b$ and deliver it through the side opening $23^c$ to the roll 25, which in turn delivers it to the studded belt 26. The belt 26 catches up the cotton and delivers it to the roll 30 which deposits it in the chute 31 leading to the feed 32, which is mounted on a shaft $27^x$. In case any of the hulls should be thrown upon the studded belt 26, they will rebound and fall through the bottom thus rendering the cotton which is eventually elevated by the belt clean and free from foreign substances. After the cotton has been delivered to the feed mechanism 32, it is fed forward with the blast into the proper receptacle.

In Fig. 5 I have indicated how the device might be extended to operate on a plurality of rows instead of only on one, the suction pipes for the other rows being shown at $F'$ and $F^2$ respectively.

I am aware that other forms of the device based upon the same general idea might be made, but I consider as my own all such modifications as fairly fall within the spirit and scope of the invention.

I claim:

1. In a cotton harvester and cleaner, a main frame, wheels therefor, a suction box depending therefrom having openings at its ends and at its bottom for permitting the entrance of the plants into the box, means for restricting the entrance of air from said open ends, and means for maintaining the plants in an upward position.

2. In a cotton harvester and cleaner, a main frame, wheels therefor, a suction box depending therefrom having openings at its ends and at its bottom for permitting the entrance of the plants into the box, a series of flexible flaps arranged to permit the passage of plants and adapted to restrict the entrance of air through said end openings and means for maintaining said plants in an upward position.

3. In a cotton harvester and cleaner, a main frame, wheels therefor, a suction box depending therefrom having openings at its ends and at its bottom and being adapted to pass over the cotton plants, a series of vertical shafts secured to said suction box each of said shafts bearing sprocket wheels, a series of flexible flaps carried by certain of said shafts and arranged to close the openings in the ends of said casing to restrict the entrance of air and a common sprocket chain for said shafts.

4. In a cotton harvester and cleaner, a main frame, wheels therefor, a suction box depending therefrom having openings at its ends and at its bottom and being adapted to pass over the cotton plants, a series of vertical shafts secured to said suction box each of said shafts bearing sprocket wheels, a series of flexible flaps carried by certain of said shafts and arranged to close the openings in the ends of said casing to restrict the entrance of air and a common sprocket chain provided with laterally extending arms arranged to pass around all the sprockets on said shafts, said arms being arranged to travel at a speed equal to the progressive movement of the suction box.

5. In a cotton harvester and cleaner, a main frame, wheels therefor, a suction box depending therefrom adapted to be passed over the cotton plants, a wheel at each end of said box provided with flexible flaps for restricting the entrance of air, a pipe leading from said box, a casing communicating with said pipe, a suction fan within said casing and cleaning devices between said suction fan and said suction box for separating the cotton from the hulls.

6. In a cotton harvester and cleaner, a main frame, wheels therefor, a suction box depending from the main frame having openings at its ends and at its bottom and being adapted to pass over the cotton plants, a series of movable flaps for restricting the entrance of air from said open ends and a series of movable arms adapted to pass above certain of said flaps for maintaining the cotton plants in an upright position.

7. In a cotton harvester and cleaner, a main frame, wheels therefor, a suction box depending from the main frame having openings at its ends and at its bottom and being adapted to pass over the cotton plants, a series of upper and lower revoluble flaps at each end of said box, a series of arms movable with respect to said flaps and adapted to pass between the upper and lower flaps of the device from the front to the rear of the machine for maintaining the plants in an upright position.

DOUGLASS HOLLOWAY MAYS.

Witnesses:
M. F. EDWARDS,
JOS. KOPPLER.